(12) United States Patent
Stanforth et al.

(10) Patent No.: US 8,398,060 B2
(45) Date of Patent: Mar. 19, 2013

(54) VIBRATION ABSORBER FOR A VEHICLE SUSPENSION SPRING

(75) Inventors: Kyle W. Stanforth, Brighton, MI (US); Steven M. Kline, Linden, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 503 days.

(21) Appl. No.: 12/624,459

(22) Filed: Nov. 24, 2009

(65) Prior Publication Data

US 2011/0121500 A1 May 26, 2011

(51) Int. Cl.
*B60G 11/14* (2006.01)
(52) U.S. Cl. .................... 267/287; 267/167; 188/378
(58) Field of Classification Search .......... 188/378–380; 267/90, 286, 287, 166–182
See application file for complete search history.

(56) References Cited

U.S. PATENT DOCUMENTS

| | | | | | |
|---|---|---|---|---|---|
| 2,801,841 A | * | 8/1957 | Blythe | ............................. | 267/33 |
| 2,807,459 A | * | 9/1957 | Copeland | ....................... | 267/33 |
| 2,829,883 A | * | 4/1958 | Copeland | ....................... | 267/287 |
| 2,875,731 A | * | 3/1959 | Settles et al. | ................... | 267/137 |
| 2,904,329 A | * | 9/1959 | Joseph | ............................ | 267/33 |
| 3,085,657 A | * | 4/1963 | Preis | ............................. | 188/380 |
| 3,128,087 A | * | 4/1964 | Hughes | ............................ | 267/33 |
| 3,622,142 A | * | 11/1971 | Lorio | ............................ | 267/287 |
| 3,806,150 A | * | 4/1974 | Peart et al. | ............. | 280/124.108 |
| 4,006,893 A | * | 2/1977 | Spencer | ........................ | 267/287 |
| 4,098,498 A | * | 7/1978 | Da Silva | ........................ | 267/287 |
| 4,614,333 A | * | 9/1986 | Gaylord | ........................ | 267/287 |
| 4,838,395 A | * | 6/1989 | Chasseguet et al. | .......... | 188/378 |
| 6,619,638 B1 | * | 9/2003 | Spencer | ........................ | 267/287 |
| 7,357,380 B2 | * | 4/2008 | Menzel et al. | ................ | 267/179 |
| 7,370,854 B2 | * | 5/2008 | Sandhu et al. | ................ | 267/169 |

FOREIGN PATENT DOCUMENTS

| EP | 552811 A1 | * | 7/1993 |
|---|---|---|---|
| EP | 574650 A1 | * | 12/1993 |

* cited by examiner

*Primary Examiner* — Xuan Lan Nguyen

(57) ABSTRACT

A dynamic vibration absorber for a vehicle suspension system includes a spring elastically supporting a vehicle body on a vehicle frame, the spring including multiple coils, an isolator secured to at least one of the coils, at least a portion of the isolator being elastically displaceable in response to movement of one of the coils, and a mass formed as unit with the isolator portion, and supported on the isolator for elastic movement.

3 Claims, 2 Drawing Sheets

VIBRATION ABSORBER FOR A VEHICLE SUSPENSION SPRING

BACKGROUND OF INVENTION

The present invention relates generally to an apparatus for reducing noise and vibration transmitted into the passenger compartment of a vehicle from the suspension system.

Rear suspension coiled springs of a motor vehicle have a surge resonance that can be excited typically through a rear drive module and transmitted into the passenger compartment of the vehicle through the rear half-shafts and the rear suspension. Generally very little energy from the rear drive module is required to excite a steel spring at its resonant frequency, typically about 80 Hz. The energy is amplified at this frequency and transmitted into the vehicle where a 'boom' period is heard, producing noise during a vibration period.

Attempting to solve the concern by significantly changing the stiffness of the springs can negatively affect the ride characteristics of the vehicle, and simply moves the noise and vibration period to a less desirable place.

Dipping or coating the suspension springs has been used to reduce spring clatter. The coating has some damping effect, but not enough to significantly reduce a surge resonance. A vehicle suspension system may use air springs and eliminate coil springs, but this option introduces a need to provide a continual, reliable source for the air in the air springs.

A need exists in the industry for a technique that separates the exciting frequency from the spring's resonant frequency and attenuates the spring's response prior to the energy being transmitted into the passenger compartment.

SUMMARY OF INVENTION

A dynamic vibration absorber for a vehicle suspension system includes a spring elastically supporting a vehicle body on a vehicle frame, the spring including multiple coils, an isolator secured to at least one of the coils, at least a portion of the isolator being elastically displaceable in response to movement of said one of the coils, and a mass formed as unit with the isolator portion, and supported on the isolator for elastic movement.

The absorber reduces noise and attenuates vibration transmitted into the passenger compartment by the suspension system without compromising ride quality or vehicle performance, or adjusting stiffness of the suspension spring.

The absorber uses a tuned mass to separate the exciting frequency from the spring's resonant frequency and damps the spring's response prior to transmitting energy into the cabin.

The isolators damp the energy and reduce the amount of dynamic energy transmitted into the vehicle. The imbedded masses either shift the natural frequency of the coil spring to a more acceptable frequency or act as a tuned absorber that reduces the amplitude of displacement at the spring's natural frequency.

DETAILED DESCRIPTION

Figure 1:
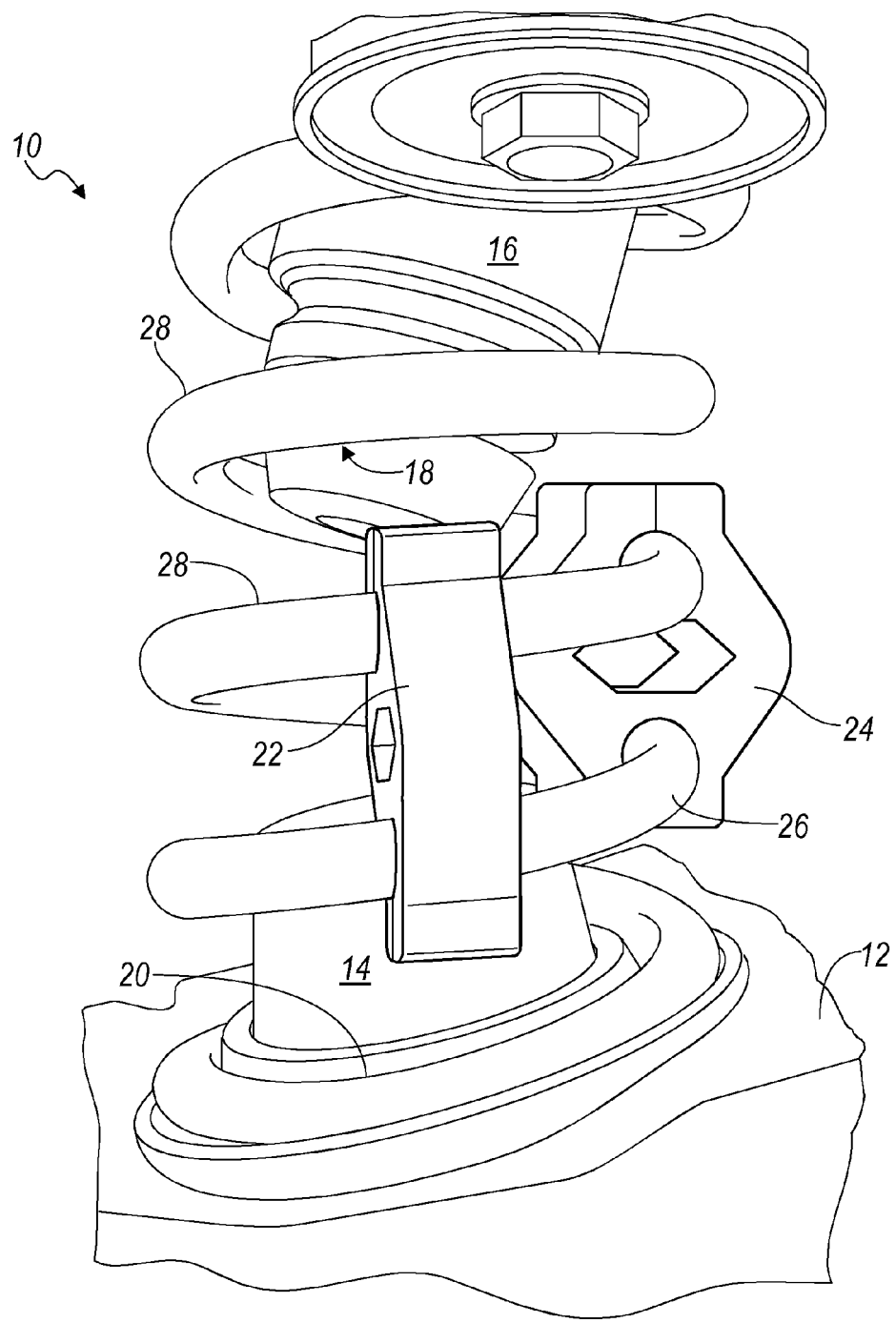
FIG. 1 is a side perspective view of an assembly showing dynamic vibration absorbers installed on a coiled suspension spring of a vehicle.

Referring now to the drawings, there is illustrated in FIG. 1 a portion of a vehicle suspension system 10, which includes a vehicle frame 12 formed with a boss 14 extending upward from the upper surface of the frame; a shock absorber strut 16 spaced from the boss and secured to the vehicle body; and a rear helical coiled compression spring 18 fitted over the boss and strut. The lowermost coil 20 of spring 18 contacts the upper surface of frame 12 and is located at the base of boss 14. Similarly, the uppermost coil of spring 18 contacts the lower surface of the body and is centered on the strut 16.

A dynamic vibration absorber added to the suspension system 10 includes first and second isolators 22, 24 secured to coils 26, 28 of the spring 18.

Figure 2:
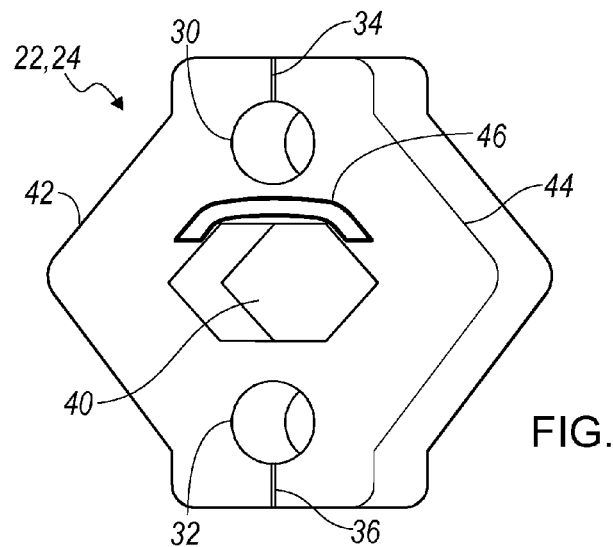
FIG. 2 is a front view of an isolator showing a single mass formed integrally with the isolator.

FIG. 2 shows that each isolator 22, 24 is formed with two circular holes 30, 32 sized to receive the coils 26, 28. Each isolator 22, 24 has a first slit 34 through its thickness and extending radially outward from the center of hole 30. Each isolator 22, 24 has a second slit 36 through its thickness and extending radially outward from the center of hole 32. The slits are used to install the isolators over the coils 26, 28 of spring 18.

Each isolator 22, 24 is formed with a central hole 40 through its thickness, and two arms 42, 44, which provide structural continuity between the holes 30, 32 and across the central hole 40.

FIG. 2 shows a tuned mass 46 molded in the isolator 22, 24 and located near the periphery of the central hole 40 and between the holes 30, 32 that engage the coils 26, 28.

Figure 3:
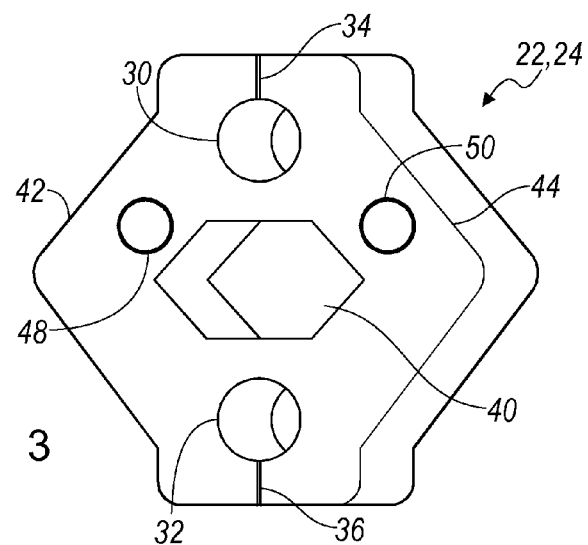
FIG. 3 is a front view of an isolator showing two masses formed integrally with the molded masses.

FIG. 3 shows two tuned masses 48, 50, in the form of solid circular cylinders or plugs, molded in the isolator 22, 24 and located in the arms 42, 44 between the holes 30, 32 that engage the coils 26, 28 on opposite sides of the central hole 40.

Figure 4:
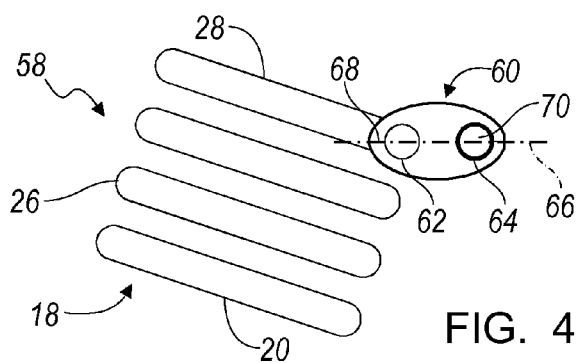
FIG. 4 is a side view of an isolator secured to a spring coil and supporting a tuned mass.

FIG. 4 shows a dynamic vibration absorber 58, in which an additional elastic member 60 with a mass is added to the vibrating system to absorb the energy that would otherwise be transmitted to the vehicle body. An isolator 60 has an oval platform having two holes 62, 64 spaced along a major axis 66 of the isolator. Coil 28 of the rear coil spring 18 is fitted into hole 62. A slit 68 extends through the thickness of the isolator and radially outward from the center of hole 62 to facilitate engaging the spring coil 28 with the isolator 58. A tuned mass 70 is molded in isolator 60 and engages hole 64. In operation, mass 70 moves due to flexure in the isolator 60. The end faces of isolator 60 are planar and mutually parallel.

The isolators are formed of a molded elastomer, preferably rubber, capable of recovering size and shape after deformation. When the material of the isolator is rubber, its preferred durometer is in the range 40-60. A preferred spring rate of the isolators 22, 24 is less than 10 N/mm. A preferred flexural spring rate of isolator 60 is less than 10 N/mm. The masses 46, 48, 50, 70 are preferably of metal, such as iron, steel or lead having a high density relative to that of the elastomer.

The isolators 22, 24, 60 alone can damp the energy and reduce the amount of dynamic energy transmitted into the vehicle. The addition of the imbedded masses 46, 48, 50, 70 can either shift the natural frequency of the coil spring 20 to a more acceptable frequency or act as a tuned absorber that reduces the amplitude of its displacement at the spring's natural frequency.

While certain embodiments of the present invention have been described in detail, those familiar with the art to which this invention relates will recognize various alternative designs and embodiments for practicing the invention as defined by the following claims.

What is claimed is:

1. A dynamic vibration absorber for a vehicle suspension system, comprising:
    a spring elastically supporting a vehicle body on a vehicle frame, the spring including multiple coils;
    an isolator secure to only one of the coils, at least a portion of the isolator being elastically displaceable in response to movement of the coils; and
    a mass formed as a unit with the isolator and supported on the isolator for elastic flexural movement relative to the coil; and
    wherein the isolator is formed with first and second spaced holes, said one coils engaged in the first hole, the second hole extends radially outward from the coil, the mass being engaged in the second hole, said movement of the mass producing flexure in the isolator.

2. The absorber of claim 1 wherein the isolator is of molded elastomer and the mass is molded integrally in the elastomer.

3. The absorber of claim 1 wherein the mass changes a natural frequency of the spring as compared to the natural frequency of the spring without the isolator being secured to the coils.

\* \* \* \* \*